(12) United States Patent
Herberger et al.

(10) Patent No.: US 7,352,952 B2
(45) Date of Patent: Apr. 1, 2008

(54) SYSTEM AND METHOD FOR IMPROVED VIDEO EDITING

(75) Inventors: Tilman Herberger, Dresden (DE); Titu Tost, Dresden (DE)

(73) Assignee: Magix AG (DE)

( * ) Notice: Subject to any disclaimer, the term of this patent is extended or adjusted under 35 U.S.C. 154(b) by 926 days.

(21) Appl. No.: 10/688,002

(22) Filed: Oct. 16, 2003

(65) Prior Publication Data

US 2005/0084232 A1 Apr. 21, 2005

(51) Int. Cl.
G11B 27/00 (2006.01)
G06F 15/00 (2006.01)
G06F 3/00 (2006.01)
H04N 7/173 (2006.01)

(52) U.S. Cl. ............... 386/4; 386/52; 386/55; 715/500.1; 715/501.1; 715/723; 725/61; 725/93; 725/116

(58) Field of Classification Search ............ 386/4, 386/52, 55; 715/500.1, 501.1, 723; 725/61, 725/93, 116
See application file for complete search history.

(56) References Cited

U.S. PATENT DOCUMENTS

| | | |
|---|---|---|
| 5,796,945 A | 8/1998 | Tarabella |
| 5,841,438 A | 11/1998 | Cave |
| 5,864,338 A | 1/1999 | Nestor et al. |
| 5,889,514 A | 3/1999 | Boezeman et al. |
| 5,978,648 A | 11/1999 | George et al. |
| 6,016,380 A * | 1/2000 | Norton ..................... 386/52 |
| 6,032,156 A | 2/2000 | Marcus |
| 6,121,963 A | 9/2000 | Ange |
| 6,243,092 B1 | 6/2001 | Okita et al. |
| 6,295,058 B1 | 9/2001 | Hsu et al. |
| 6,330,004 B1 | 12/2001 | Matsuzawa et al. |
| 6,557,017 B1 | 4/2003 | Venable |
| 7,149,961 B2 * | 12/2006 | Harville et al. .......... 715/501.1 |
| 2002/0052976 A1 | 5/2002 | Loesch et al. |
| 2002/0087435 A1 | 7/2002 | Neishi et al. |
| 2002/0109710 A1 | 8/2002 | Holtz et al. |
| 2002/0138843 A1* | 9/2002 | Samaan et al. ............. 725/87 |
| 2003/0001880 A1 | 1/2003 | Holtz et al. |
| 2003/0034999 A1 | 2/2003 | Coughlin, III et al. |
| 2003/0051255 A1 | 3/2003 | Bulman, et al. |
| 2003/0090504 A1 | 5/2003 | Brook et al. |
| 2003/0215214 A1* | 11/2003 | Ma .......................... 386/52 |

* cited by examiner

*Primary Examiner*—Thai Q. Tran
*Assistant Examiner*—Syed Y. Hasan
(74) *Attorney, Agent, or Firm*—Fellers, Snider, Blankenship, Bailey & Tippens, P.C.; Terry L. Watt

(57) ABSTRACT

There is provided herein an invention that utilizes a themed template which is designed to assist novice video editors quickly compose a complete video work which memorializes a particular familiar occasion, such as, for example, a birthday, a wedding, a trip to the theme park, etc. The template for each such occasion will be customized with predefined cells that are annotated with descriptions of events that might occur during said occasions. A user will be able to drop his or her own video and/or audio clips taken at the occasions into the cells and, if this is done according to the annotations, thereby create a complete video work that memorializes the selected occasion.

21 Claims, 3 Drawing Sheets

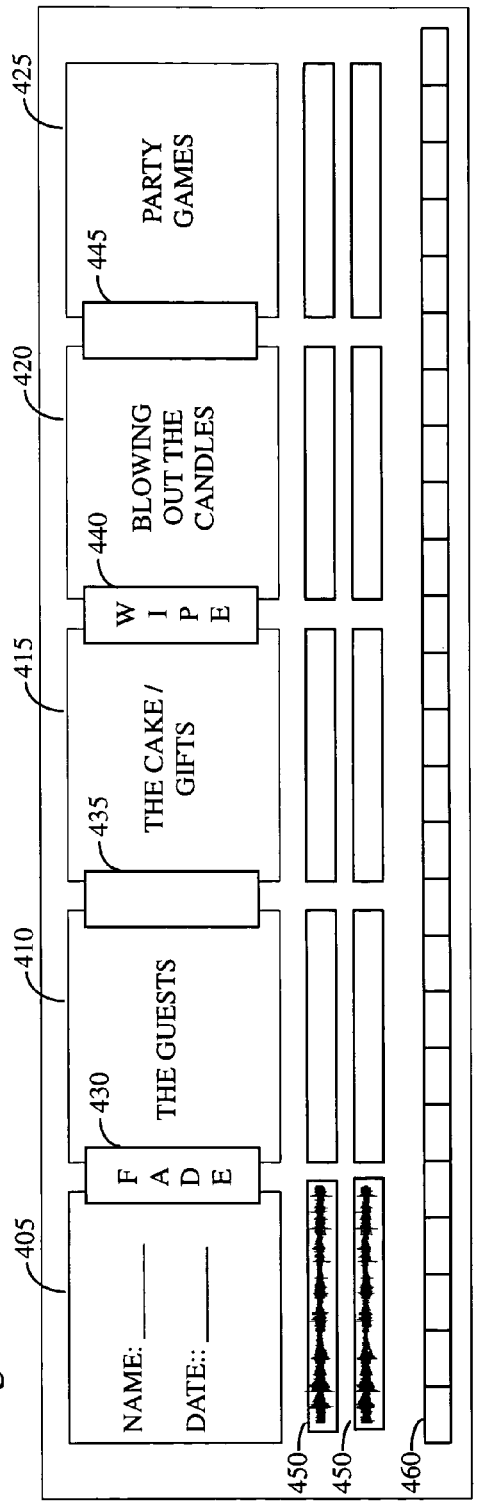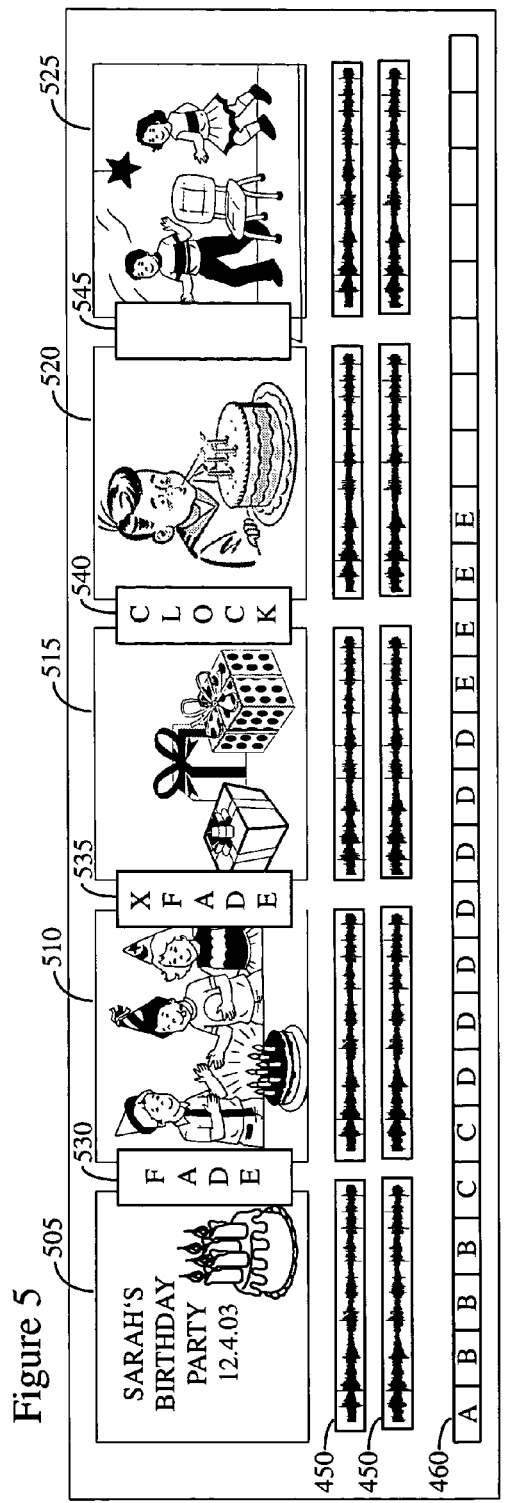

SYSTEM AND METHOD FOR IMPROVED VIDEO EDITING

FIELD OF THE INVENTION

The present invention relates generally to the editing and organizing of video material for subsequent replay. More particularly, but not by way of limitation, the present invention relates to methods of assisting a novice user to quickly compose a complete video work from a set of related audio and video items.

BACKGROUND OF THE INVENTION

Although many home movie enthusiasts are satisfied with taking video and then subsequently showing the raw video footage to acquaintances, the trend today is toward more post-show editing to improve the product. The ready availability of digital cameras and editing software which runs on conventional personal computers has encouraged even the novice videographer to try his or her hand at editing. Obviously, a properly edited video can be much more entertaining and enjoyable for the viewer than the unedited footage which may contain large sections of unusable or irrelevant material. Additionally, to the extent that background music, transition effects, etc., are added to the project, the work can take on a near-professional quality which, for some individuals, is its own reward.

There are any number of computer programs that provide a user with the ability to edit digital video. Companies such as Adobe, Avid, Apple, and many others provide high-end solutions which would be suitable for use in a professional environment. Others have concentrated on the consumer market, but typically those programs are merely scaled down version of the high end products. That is, the main focus of such consumer products is often to ease the novice user into the market for the more expensive product by selling him or her an editor with a restricted number of features as compared to the high-end program. Seldom is there any consideration given to the basic problem of streamlining the entire process from assembly of discrete video clips to writing a finished product to DVD or tape.

Of course, from the end-user's perspective digital editing of video can be a daunting process. The software that is available for purchase is complex and there is usually little guidance offered as to where to begin. For example, upon starting a video editing program the user is typically confronted with a computer screen full of empty windows. Just learning the usage and features of each such window can take time and effort. Further, just learning the vocabulary of video editing (e.g., transitions, key frames, slip/slide/rolling edits, etc.) is itself sometimes a major undertaking.

This is in spite of the fact that most home users' video editing needs are actually, for the most part, fairly modest. What a user typically wants to do is to organize video footage from an event or holiday (e.g., a birthday, family reunion, Christmas morning package opening, trip to an amusement park, etc.) into a more pleasing format, deleting footage that was out of focus, underexposed, etc., and adding video transition, titles, music and/or other sound effects to give the movie a more polished appearance.

As a consequence, many nonprofessional users have avoided venturing into the realm of video editing as they are not willing to invest the time and effort necessary to master the specialized tools, technology, and terminology of the trade.

Thus, what is needed is a method for assisting a user quickly organize his or her video images into a coherent work. It would additionally be preferred that simplified options be provided for titling the work, adding transitions between scenes, eliminating unwanted footage, etc., to create a final product that has a polished appearance.

Heretofore, as is well known in the video editing industry, there has been a need for an invention to address and solve the above-described problems. Accordingly, it should now be recognized, as was recognized by the present inventors, that there exists, and has existed for some time, a very real need for a system and method that would address and solve the above-described problems.

Before proceeding to a description of the present invention, however, it should be noted and remembered that the description of the invention which follows, together with the accompanying drawings, should not be construed as limiting the invention to the examples (or preferred embodiments) shown and described. This is so because those skilled in the art to which the invention pertains will be able to devise other forms of this invention within the ambit of the appended claims.

SUMMARY OF THE INVENTION

According to a preferred embodiment, the instant invention begins with the preparation of a standardized template which is customized to reflect a commonly occurring personal or family video situation. For example, the template might be designed for use in preparing home movies of a wedding, birthday party, graduation, Christmas celebration, or any other sort of personal, holiday, or family event. In other embodiments, the template would be customized to reflect a home video based on a visit to a particular city or theme park or other vacation location.

The preferred video template will contain predefined "cells" or insertion points into which a user will be directed to drop specifically themed video clips or other components of a video work (e.g., still digital photos, audio tracks, etc.). The suggested content intended for each such cell is chosen by the template designer in such a way as to broadly characterize the key aspects of the selected event, i.e., preferably each cell will similarly be themed. For example, a template that has been designed for use with amusement park video footage, there might be an initial cell labeled "arrival", a subsequent cell labeled "the first ride", followed by "lunch", "going home", etc., the intent being that if all of the various cells are all filled with video clips corresponding to the cell designation, a complete video work will be produced that memorializes the occasion.

As a further example of how the template might be arranged, it is preferred that between each user-filled video cell is placed either a pre-defined or user selectable transition, title lettering, etc., which serves to unify the video work and explain to the audience the significance of the next/previous video clip.

Still further, in some instances it is preferred that pre-selected video clips be placed by the template designer within various of its video cells. In one preferred arrangement, the initially-provided video clips will be stock footage that is useful in setting the mood of the template, e.g., a generic video clip of exploding fireworks for an Independence Day template, a video of clowns and elephants for a circus template, a special effects video clip of ghosts for use in a Halloween template, etc.

Additionally, background music track or tracks will preferably be provided which has been loaded with music to complement the theme of the template. For example, the background music for a Christmas event template would preferably be one or more traditional Christmas tunes. Users will preferably be able to either accept the suggested audio material or select another work. Additionally, it is preferred that an option be provided to allow the user to add his or her own voiceover narration, if that is desired.

It should be clear that a structured approach such as this would be a tremendous aid to the novice user who wishes to quickly create a professional-looking video record of an event, but who does not have the creativity, time, or inclination to learn to utilize the various software products that would otherwise be required to create such a video work.

The foregoing has outlined in broad terms the more important features of the invention disclosed herein so that the detailed description that follows may be more clearly understood, and so that the contribution of the instant inventors to the art may be better appreciated. The instant invention is not to be limited in its application to the details of the construction and to the arrangements of the components set forth in the following description or illustrated in the drawings. Rather, the invention is capable of other embodiments and of being practiced and carried out in various other ways not specifically enumerated herein. Additionally, the disclosure that follows is intended to apply to all alternatives, modifications and equivalents as may be included within the spirit and scope of the invention as defined by the appended claims. Further, it should be understood that the phraseology and terminology employed herein are for the purpose of description and should not be regarded as limiting, unless the specification specifically so limits the invention. Further objects, features, and advantages of the present invention will be apparent upon examining the accompanying drawings and upon reading the following description of the preferred embodiments.

BRIEF DESCRIPTION OF THE DRAWINGS

FIG. 4 provides a diagram of an empty template suitable for use with the instant invention.

FIG. 5 illustrates how the empty template of FIG. 4 might appear after a user has provided his or her own video and audio clips.

DESCRIPTION OF THE PREFERRED EMBODIMENTS

Figure 1:
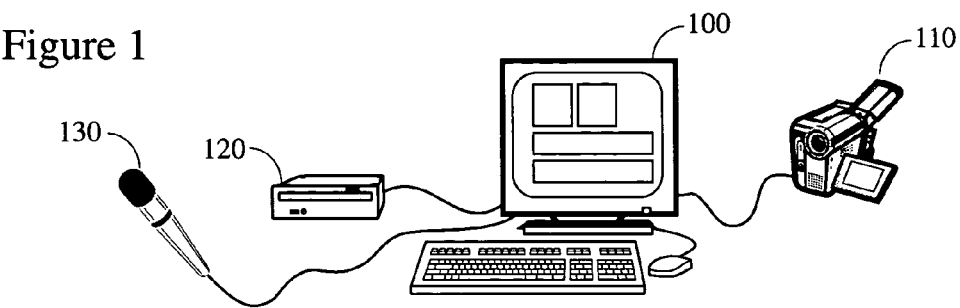
FIG. 1 depicts the general environment of the instant invention.

Referring now to the drawings, wherein like reference numerals indicate the same parts throughout the several views, there is provided herein a preferred system and method for assisting a user in creating a video work that memorializes a particular event. As is generally indicated in FIG. 1, at least a portion of the instant invention will be implemented in the form of software running on a user's computer 100. Such a computer 100 will have some amount of program memory and hard disk storage as conventionally supplied with such units. Additionally, it is anticipated that a video camera 110 of some sort will be utilized with and will preferably be connectible to the computer 100 so that video information can be transferred to and from the computer 100. Preferably the camera 110 will be a digital video camera, although that is not a requirement. Further, given the modern trend toward incorporation of cameras into other electronic components (e.g., in handheld computers, telephones, laptops, etc.) those of ordinary skill in the art will recognize that the camera 110 might be integrated into the computer or some other electronic device and, thus, might not be a traditional single-purposes video camera. Although the video camera 110 will preferably be digital in nature, any sort of camera might be used, provided that the proper interfacing hardware between it and the computer 100 is utilized. Finally, in some applications a microphone 130 which is preferably attached to computer 100 might be provided for use by the video editor. Among other uses, the microphone would allow a user to add voiceover narration to the video work if that were desired.

Figure 6:
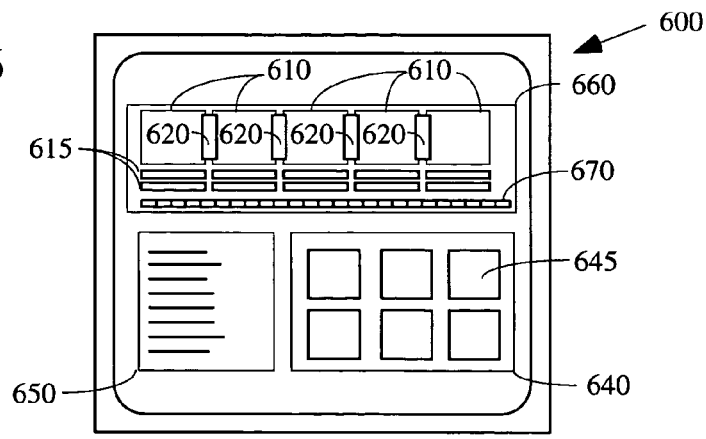
FIG. 6 illustrates a preferred computer screen layout suitable for use with the instant invention.

Turning next to FIG. 6, in a preferred arrangement a user will interact with the instant invention by way of a computer monitor 600. Preferably, the screen layout as it appears on the computer monitor 600 will include a graphical representation of the selected themed video template 660, including cells 610 into which visual digital works may be placed and tracks 615 suitable for receipt of audio works. It should be noted that the sort of digital visual works contemplated by the inventors that might be suitable for addition to each such cell 610 include both video clips as well as individual graphic images (e.g., a "JPG" file or other static image file) which might come from, for example, a digital still camera, a single frame of a video clip, or from a scanned conventional photograph. Of course, in the event that the user elects to use a single/static image within a template location 610, preferably the instant method will automatically select an appropriate viewing time (e.g., a few seconds) for that image when it is incorporated into and rendered as part of the video work. Of course, the user might be given the option of modifying this predetermined viewing time to suit his or her own tastes and needs.

Additionally, it is preferred that one or more screen regions of the video monitor 600 be dedicated to receiving input from the user. For example, in one preferred embodiment an audio input file list 640 and a video input file list 650 are provided to allow a user to select an appropriate input media type and then "drag and drop" his or her selection into a desired temporal location within the graphical representation of the video template 660. Note that the file lists 640 and 650 might be alphanumeric lists or thumbnails or other graphical representations of the works that they represent. Further, and as is well known to those of ordinary skill in the art, the input media which are represented within file lists 640 and 650 might be stored locally (e.g., on hard disk, nonvolatile memory card, video tape, etc.) or stored remotely and accessed via a network (e.g., intranet, LAN, WAN, Internet, etc.).

Additionally, it is preferred that audio cells 615 be provided to allow a user to easily add audio works to the video project. Preferably, each of these screen locations 615 will correspond to one of the video cells 610, thereby making it easy to add music, sound effects, narrative voiceovers, etc. to a particular scene in the movie. Preferably at least two audio tracks 615 will be provided to accommodate stereo. However, those of ordinary skill in the art will recognize that in some circumstances additional (multi-track) or fewer (e.g., monophonic) audio channels might be utilized.

Finally, it is also preferred that the screen layout include a timeline 670, one purpose of which is to visually communicate to a user the amount of actual or relative time within the video work that is taken up by each of the selected film clips. Such information might be communicated in many ways including, for example, highlighting sections of the timeline to indicate relative length, reproducing a thumbnail of each selected video clip within a rectangle that has been sized to represent the duration of that clip, etc.

Turning next to FIGS. 4 and 5, according to a preferred embodiment the screen layout will contain at least the fields mentioned previously and, in practice, the input fields will contain explanatory annotation to make it clear to a user what sort of film clip should be inserted into the template at each location. Note that, for purposes of illustration only, FIGS. 4 and 5 reflect the use of a birthday party template, i.e., a video template that is designed to assist an end user in documenting a child's birthday party. It should be noted and remembered that this themed template is offered by way of illustration, and not limitation, and those of ordinary skill in the art will be readily able to develop alternative themed templates to suit any number of occasions.

In FIG. 4, the illustrated portion of template 660 provides for one annotation insertion point (cell 405), four video insertion points (cells 410 through 425), four transitions (430-445), two audio channels 450, each of which might or might not be coupled directly to a video cell, and a timeline 460.

Figure 3:
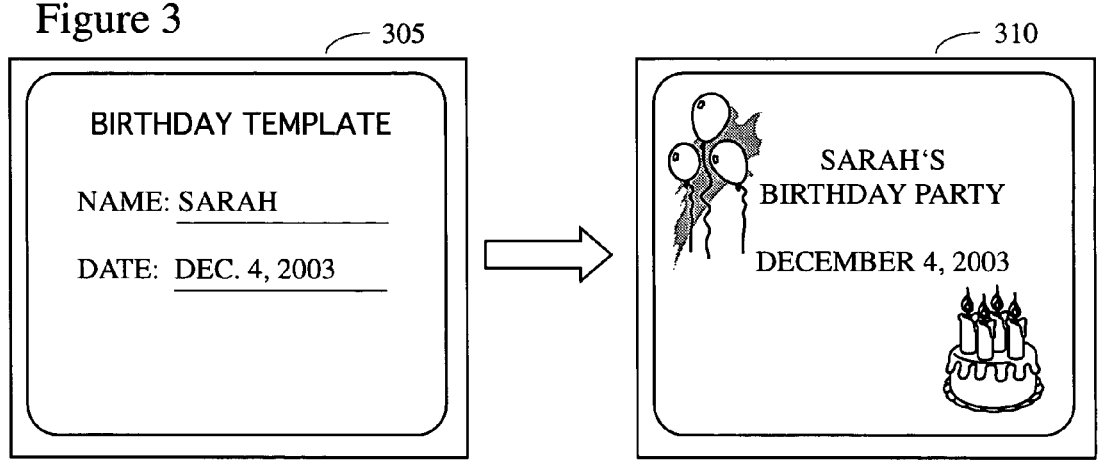
FIG. 3 illustrates how textual information provided by a user is rendered into a themed video title page.

First with respect to the annotation insertion point 450 and as is illustrated more fully in FIG. 3, in certain types of input cells the user will be prompted to enter text that specifies particulars of the birthday celebrant and/or of the party into the template. This information could include the celebrant's name, the date of the birthday party, the then-age of the celebrant, the location of the party, etc. Entry by a user of this sort of information will enable the instant method to compose a title video clip of a preferred length that contains the entered information and possibly additional indicia of a birthday celebration (e.g., a picture of a cake, balloons, etc.) as is illustrated in the right hand screen display of FIG. 3. Of course, depending on the preference of the template designer, the length of time that this—or any other—title is visible on the screen within the rendered video work might or might not be alterable by the end user.

This is similarly illustrated in FIGS. 4 and 5 wherein the empty template location 405 is replaced by a thumbnail of the title slide 505 as it will appear in the completed video work. Note that, although a title template was used to illustrate the use of this sort of input field, additional customizable explanatory textual material might be located throughout the template according to the desires of the designer. For example, narrative slides could be positioned between each of the template locations 410 through 425 to act as an introduction to the video material that follows. Further, these narrative slides could be pre-inserted by the template designer and be selected in concert with the theme of the template, or the task of filling in the explanatory text might be left to the user. Still further, if the template designer so desired, the title slide could be placed on top of a video work. This work might be provided by the designer (e.g., a woodland snow scene for a Christmas template, etc.) or by the end user. Obviously, those of ordinary skill in the art will be able to devise many alternative arrangements involving the use of textual material in concert with the instant invention.

Additionally accompanying template location 405 is a pre-filled audio track 450. In this particular instance, the template designer has provided an initial/suggested audio track 450 to accompany the title clip. This track might contain, by way of example only, a recording of the "Happy Birthday" song, a recording of children laughing or singing, etc. This suggested audio clip may or may not be alterable or replaceable according to the choice of the template designer. That is, in some embodiments the user might be given the option of replacing the selected audio information with his or her own sound source. However, in other cases the template designer may not allow the user to substitute his or her own audio tracks for those originally provided. Of course, either option would be within spirit of the instant invention.

As is indicated in FIG. 4, template cell locations 410 through 425 have been provided with annotations that are designed to guide the user in the process of adding his or her own video clips. For example, the first template cell 410 is labeled "The Guests" and suggests that the user should insert one ore more video clips that contain, for example, a view of automobiles as they pull up to the party location and disgorge their occupants, a pan of a room containing the party attendees, etc. Similarly, template cell 415 suggests that the user provide a video or still photograph of the cake and/or party gifts. Template cell 420 and 425 suggest that the user should provide videos of the candles on the cake being blow out and the children playing party games, respectively. Obviously, the user need not slavishly follow these suggestions, but if so followed the resulting video work will be in accord with the template designer's intent. Corresponding template cells 505-525 in FIG. 5 illustrate schematically how the template might appear after receipt of the user's video clips, wherein each such clip is represented by a thumbnail image which will typically be the first frame in the clip. Of course, those of ordinary skill in the art will recognize that there are many ways in which the selected clip could be identified to the user (e.g., a listing of the actual computer file names, etc.).

Additionally, each of the template cells 410-425 preferably has an associated audio track which would typically be occupied in the template by the sound track of the corresponding video clip (e.g., video clips stored at locations 510 through 525 in the instant example). In the preferred embodiment, the audio track will comprise at least two separate tracks to accommodate stereo recordings. That being said, those of ordinary skill in the art will recognize that audio tracks in excess of two would be useful where, for example, a user wished to add a descriptive overdub or background music to the actual video clip sound track.

Preferably, one or more video transition effects 430-445 will be pre-selected by the template designer and symbolically positioned in the template between successive clips. As is well known to those of ordinary skill in the art, video transition effects are used to soften abrupt scene changes between successive video clips. Some examples of commonly employed video transition effects include wipes (e.g., edge wipes, clock wipes, etc.), fades (fade down/fade up, cross fades, etc.), dissolves, irises, etc. In the preferred embodiment a collection of appropriate wipes will be selected by the template designer and made a part of the template. However, in a preferred arrangement the user will not be required to adopt the pre-selected transitions but may, instead, substitute his or her own. As is generally indicated in FIGS. 4 and 5, by way of example the user may accept the designer's choice of transition (transition 430/530 and the "no transition" option illustrated by 445/545), select a transition effect where one has not been suggested (transition 435/535) or override the choice of the designer (transition 440/540). All of these options are possible and well within the spirit of the instant invention.

Finally, timeline 460 is provided to give the user a feel for the composition of the completed video work. As is generally illustrated in FIG. 5, in the preferred embodiment some indication of the relative length of each included video clip will be displayed within the timeline 460. In the example of FIG. 5, a letter of the alphabet has been associated with each of the template locations (i.e., "A" with the first location 510, "B" with the second 515, etc.) and the number of the same letters that appear in sequence represents the length of the video clip (e.g., each segment of the time line might represent ten seconds of video play time). Of course, those of ordinary skill in the art will recognize that there are many ways in which this play-time information could be communicated to the user including, without limitation, a timeline that represents the running time of each video clip in a different color, with a thumbnail of the corresponding clip, etc.

Figure 2:
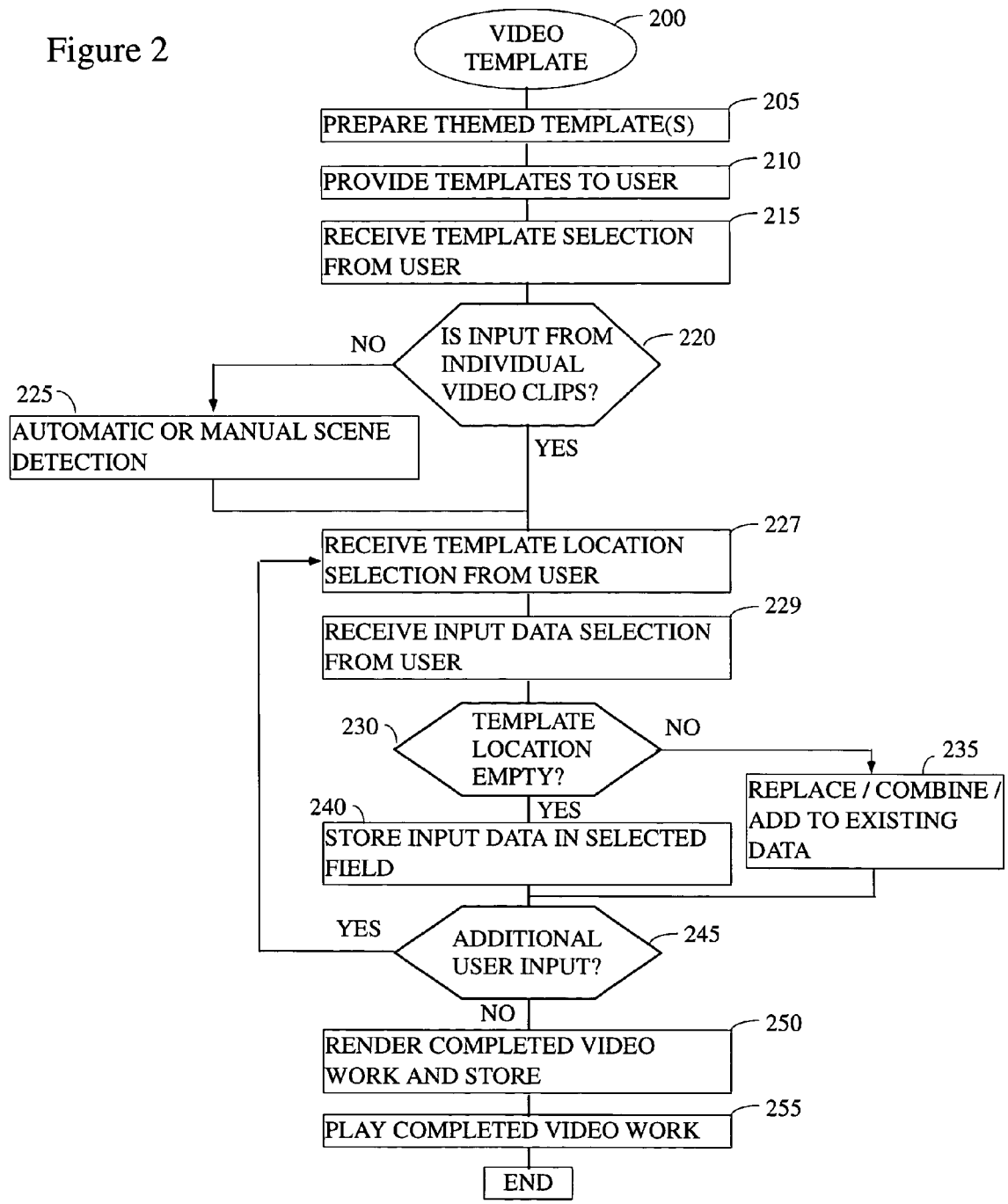
FIG. 2 contains a flowchart which illustrates some preferred steps in the instant method.

Turning next to FIG. 2, in practice the instant method 200 would preferably operate as follows. As a first preferred step, one or more themed templates are created (step 205) by a designer. As used herein, the term themed template should be interpreted in its broadest sense to mean a predefined video layout which contains designed themed insertion points wherein a user may place digital film clips or other digital media and which, when thereafter rendered and played in a conventional manner, produces a coherent video work. The template cells should further contain descriptive annotation provided by the template designer to assist the user in matching his or her own video clips with the corresponding template location.

As a next preferred step, the one or more themed video templates will be presented to a user (step 210) for selection by him or her (step 215). As is conventionally done, each such themed composition will preferably be identified to the user as representing a particular type of event, e.g., "Birthday", "Fourth of July", "Trip to the Grand Canyon", etc.

Next, the user will be given the opportunity to select one of the themed video templates (step 215). Those of ordinary skill in the art will recognize that such a selection might be presented to the user in the form of a textual list of template names, graphical representations of each template, some combination of the foregoing, etc. The user will preferably be offered the option of selecting a template by using a mouse as is conventionally done. That being said, there are many ways in which this selection might be accomplished and those of ordinary skill in the art will recognize the exact manner in which this step is performed is not important to the operation of the instant invention.

As a next preferred step, a determination will need to be made as to whether the user's video input is in the form of a single continuous work (e.g., it is being read directly from the video camera) or whether it has been previously divided up into individual scenes (step 220) and stored on disk as separate files according to methods well known to those of ordinary skill in the art. If the input data have not yet been divided into short segments, it is preferred that the user initiate an automatic scene detection program which would take undivided work as input and produce a collection of individual clips therefrom according to methods well known to those of ordinary skill in the art. Alternatively, the user could certainly manually edit the video input into individual clips (step 225). Ideally, at least some of the resulting clips will contain video of events that correspond to the template designations selected by the designer.

As a next preferred step, the user will be allowed to select one of the numerous input fields within the template (step 227) and specify the data that will be entered therein (step 229). As has been discussed previously, the input fields within the template may be of a variety of different types. A first type of input field is designed to receive video clips from the user (e.g., template locations 410-425). This sort of input field will be preferably filled by "drag and drop" of a chosen video clip from the input file region 640 of the screen layout to the template 660. Doing so will cause the clip to be placed within the template according to its ordering and will further preferably cause its thumbnail to appear as is generally illustrated in FIG. 5.

A second type of input field is provided to allow the user to enter textual information into the video project (e.g., template location 405). This field would be useful, say, at the beginning of the video work when the user might be prompted to enter a title for the work, a date that the video materials was collected, etc. As a specific example, the "birthday" template might allow the user to input an initial title screen that included the name of the individual celebrating the birthday, the date etc. Such information would then be incorporated into the birthday-themed title screen (FIG. 3). Of course, additional title, credit, or narrative input screens might also be provided within the template to allow the user to further customize the final video product by entering static or dynamic (e.g., rolling) text.

A third type of input field is preferably provided in order to allow the user to add audio information to the video work (e.g., template location 450). As has been mentioned previously, the appearance of the audio tracks—and preferably there will be at least two such tracks to accommodate stereo video recordings—on the user's monitor will preferably include a graphical representation of the sound itself, although it is certainly possible that a simple iconic representation could be used instead to show whether or not a sound track is present. Note that the length of each audio track may or may not correspond to the length of the associated video clip. For example, a narrative voiceover might span several different video clips and background music could conceivably last the duration of the entire video work.

Given the template, the preferred embodiment continues by allowing the user to choose the input data which is designated for the selected template location (step 229). Preferably, this will be accomplished via "drag and drop" between file input windows 640 and 650 and the template locations. Additionally, it would normally be expected that there be some check on the sort of information that the user is allowed to assign each template location, with at least some minimal screening by the software to make certain that an audio track is not dropped into a video template location. That being said, in some cases more than one type of file might be suitable for use in some template locations including, for example, a static digital image file (e.g., ".JPG", ".GIF", ".BMP", etc.) could certainly be accepted for input into a video template cell. Of course, the attendant software will preferably resize the selected digital image file to fit within the confines and aspect ratio of a video frame.

As a next preferred step, a determination will be made as to whether the template location selected by the user is empty (step 230) and, if not, what sort of action to take. In the instance where the selected template location is empty, preferably the selected media will be inserted into the video work at a time subsequent to the earlier video clips in the work. That is, the precise time-location in the video work at which a new clip is to be placed will be a function of the lengths of the clips that have been inserted ahead of it. Such insertion will preferably be accompanied by adding a representation of the selected video clip to the template display (e.g., as is illustrated in FIG. 5).

However, if the template location is not empty, a determination will preferably be made as to whether the user wishes the newly selected data to replace the existing data, be combined with the existing data, or added onto the end (or at the beginning of) the existing data (step 235). By way of example, consider the case where a video clip is dropped into a template location which has a preexisting video clip stored therein. One alternative would be to replace the first clip with the second clip in its entirety, lengthening or shortening the entire video work accordingly. A second alternative would be to digitally combine the two video works so that both could be viewed simultaneously. This approach might be especially desirable where blue or green screen technology has been employed to extract a portion of one video clip with the intention of overlaying it on another. Finally, a third alternative might be to add the second clip to the front or end of the existing clip so that the two could be viewed end to end. This might be done with or without interposition of a transition effect between the two clips. Those of ordinary skill in the art will understand that these are just a few of the many treatments that could be applied to the case where one media file is added to a template location that contains another media file. Note that a similar logic will be employed where an audio clip is added to the template.

It should be noted that the instant inventors have specifically contemplated that some of the video cells in the template 660 might be preloaded with stock footage video which is designed to help the user set the mood or tone of the completed work. For example, if the theme of the template is a visit to the Grand Canyon, the title slide might contain—in addition to user-provided descriptive text—a video clip that is played behind the title text and which contains general views of the canyon including, for example, a helicopter fly-over of a portion of the canyon, a stationary camera at the rim panning the scenery, etc. Similarly, a Christmas template could contain pre-selected footage of snow fall in a forest, Santa and his reindeer, etc., which might be positioned by the template designer at the start of the template, the end or anywhere in between. Whether the user will be allowed to replace the pre-selected video clips is a matter of design choice and is left to the sound discretion of the template designer.

In the preferred embodiment the instant method will continue so long as the user desires to add additional media to the template (step 245). Once that process is completed or if the user wishes to see the current status of an unfinished video work, the user will preferably elect to render the video work (step 250). Note that such rendering may, if the computer hardware is fast enough, be performed on the fly as each new media item is added to the template. The step of rendering could include such common tasks as converting the title image to a video clip, converting any static images within the video template to video clips of a predetermined duration, calculating and applying transition effects, digitally combining video clips, and applying other effects to the video and/or audio tracks. It is also preferred that at this step the completed video work will be stored to disk, video tape, DVD, CD, etc. for subsequent viewing.

Finally, it is expected that the user will wish to view the rendered work (step 225). Of course, in the case where the user has merely viewed an intermediate result it would be expected that the user would return thereafter to, for example, step 227 to continue further editing.

Conclusions

Of course, many modifications and extensions could be made to the instant invention by those of ordinary skill in the art. For example, in one preferred embodiment the sequence of cells will be fixed by the template designer, i.e., the themed cells and clips inserted therein must be viewed sequentially in the order established by the designer. However, in other embodiments, the user will be allowed to reorder the cells within the selected template (e.g., by dragging with the mouse) to suit his or her own tastes.

Those of ordinary skill in the art will recognize that when a video cell is spoken of herein as "containing" a video clip, that language should be broadly interpreted to include cases where a link to a disk file containing the clip is maintained within the controlling program. That is, there is no requirement that the various video and/or audio clips that are designated within the template actually be "copied" into those locations, nor that the video/audio information be made a part of the template in any way. In the preferred arrangement, each time a user "drags and drops" a video or audio file into a template cell, a link will be created back to the video clip. Of course, when the finished video work is rendered or written to tape—or when the user wants a preview of the final work during the process of editing—all of the associated files will be read and inserted into the output at the proper time.

It is generally expected that the contents of a video template will be rendered before being viewed or written to output in a final form. That being said rendering may not always be strictly necessary in the case where, for example, the template does not contain any static slides of textual, graphic, etc., information nor any transitions or effects. In such a case, e.g., where the template cells contain only a collection of video clips which have been stored in themed cells in the order suggested by the template designer, in theory no rendering in the traditional sense would be necessary, as the film clips could just be written sequentially to disk/tape. However for purposes of the instant invention, the term "rendering" will be interpreted in its broadest sense to mean creation of individual video frames (e.g., traditional rendering) as well as assembling a collection of individual video clips into a continuous/unified video work.

Further it should be noted that although it is preferable that a user fill in every cell in his or her selected video template, that is not strictly required. In some cases a user may not have acquired footage that corresponds to a particular template cell theme (e.g., the user did not acquire footage at a birthday party of the candles being blown out). In such a case, it is preferred that when the template is rendered and/or viewed that the cells which are empty simply be omitted from the rendering and/or viewing. Other variations are certainly possible including, for example, automatic selection of a themed movie clip to fill in a video cell which is empty.

Thus, the present invention is well adapted to carry out the objects and attain the ends and advantages mentioned above as well as those inherent therein. While the inventive device has been described and illustrated herein by reference to certain preferred embodiments in relation to the drawings attached hereto, various changes and further modifications, apart from those shown or suggested herein, may be made therein by those skilled in the art, without departing from the spirit of the inventive concept, the scope of which is to be determined by the following claims.

What is claimed is:

1. A method of assisting a user compose a video work, wherein is provided at least one themed template, each of said at least one templates containing a plurality of media cells therein, each of said media cells having a cell theme that is related to the theme of the template containing it, and wherein is further provided a plurality of topically related media clips, comprising the steps of:
    (a) selecting one of said at least one themed templates;
    (b) selecting a media clip from among said plurality of topically related media clips;
    (c) selecting a media cell from among said plurality of media cells in said selected template;
    (d) storing said selected media clip in said selected media cell;
    (e) performing steps (b) through (d) until substantially all of said media cells are filled, thereby composing said video work; and,
    (f) storing at least a portion of said video work on a computer readable medium.

2. A method according to claim 1, further comprising the step of
    (g) reading at least a portion of said stored video composition from said computer readable medium; and,
    (h) viewing at least a portion of said read video composition.

3. A method of assisting a user compose a video work according to claim 1 wherein said topically related media clips comprise topically related video clips.

4. A method of assisting a user compose a video work according to claim 3 wherein said topically related media clips further comprise topically related audio clips.

5. A method according to claim 1, wherein each of said media cells within said selected template occurs in a fixed sequence order.

6. A method according to claim 3, wherein at least one of said media cells within said selected template contains a preloaded video clip therein, said preloaded video clip being chosen to be consistent with said theme of said selected template.

7. A method according to claim 1, wherein step (e) comprises the step of
    (e1) performing steps (b) through (d) until substantially all of said media cells are filled with user selected media clips,
    (e2) rendering said selected template and said media clips contained therein, thereby creating said video work.

8. A method according to claim 3, wherein step (e) comprises:
    (e1) performing steps (b) through (d) until substantially all of said media cells are filled with user selected video clips, thereby creating a video composition.

9. A method creating a video composition, wherein is provided a plurality of topically related video clips and a plurality of audio clips, and wherein is provided at least one themed template, each of said at least one themed templates containing a plurality of themed video cells, a plurality of audio tracks, and at least one annotation cell, therein, comprising the steps of:
    (a) selecting one of said at least one themed templates;
    (b) selecting a video cell from among said plurality of themed video cells, said selected video cell having a cell theme associated therewith;
    (c) selecting a video clip from among said plurality of topically related video clips, said selected video clip having a theme at least approximately matching said cell theme;
    (d) storing said selected video clip in said selected video cell;
    (e) selecting an audio clip from among said provided audio clips;
    (f) selecting a track from among said selected template tracks;
    (g) storing said selected audio clip in said selected template track;
    (h) selecting one of said at least one annotation cell;
    (i) requesting from a user a text string for insertion into said selected annotation cell;
    (j) inserting said user text string into said selected annotation cell;
    (k) performing at least steps (b) through (j) until at least one audio track has been added to said selected template, until at least one user text string has been inserted into at least one annotation cell, and until at least two of said themed video cells are filled with selected video clips, thereby creating a video composition; and,
    (l) viewing at least a portion of said video composition.

10. A method according to claim 9, wherein at least one of said video cells within said selected template contains a preloaded video clip, and wherein said preloaded video clip has a theme that is consistent with said theme of said selected template.

11. A method according to claim 9, wherein at least one of said audio tracks within said selected template contains a preloaded audio clip, said preloaded audio clip having been chosen to be consistent with said theme of said selected template.

12. A method according to claim 9, wherein step (d) comprises the step of:
    (d1) if said selected video cell does not contain a video clip stored therein, storing said selected video clip in said selected video cell, and,
    (d2) if said selected video cell contains a stored video clip therein, replacing said video clip with said selected video clip.

13. A method according to claim 9, wherein step (k) comprises the step of
    (k1) performing steps (b) through (j) until at least one audio track has been added to said selected template, until at least one user text string has been inserted into at least one annotation cell, and until substantially all of said themed video cells are filled with video clips, and,
    (k2) rendering said selected video template and the video clips contained therein, thereby creating said video composition.

14. A method of assisting a user compose a video work, wherein is provided a plurality of topically related video clips, comprising the steps of:
    (a) providing the user with at least one themed template, each of said at least one themed templates containing a plurality of video cells therein, wherein each of said video cells within a particular template has a theme related to a theme of said particular template, and wherein said video cells are ordered within said particular template in an ordering related to said theme of said particular template;
    (b) receiving a selection of one of said at least one themed templates;
    (c) receiving a selection of a video clip from among said plurality of topically related video clips;
    (d) receiving a selection of a video cell from among said plurality of video cells within said selected template, wherein a theme of said selected video clip at least approximately matches a theme of said selected video cell;

(e) storing said selected video clip in said selected video cell;

(f) performing steps (c) through (e) at least twice, thereby composing a video work; and, (g) viewing at least a portion of said composed video work.

15. A method according to claim 14, wherein each of said video cells in said selected template occurs in a fixed sequence order.

16. A method according to claim 14, wherein said theme of said themed video template is selected from a group consisting of a birthday celebration, a national holiday, a visit to an amusement park, a visit to a public park, a visit to a national monument, a wedding, a party, and a family reunion.

17. A method according to claim 14, wherein at least one of said video cells within said selected template contains a preloaded video clip, and wherein each of said preloaded video clips has a theme that is consistent with a theme of said at least one video cell that contains it.

18. A method according to claim 14, wherein step (e) comprises the step of:

(e1) if said selected video cell is empty, storing said selected video clip in said selected video cell, and, (e2) if said selected video cell contains a preloaded video clip therein, replacing said preloaded video clip with said selected video clip.

19. A method according to claim 14, wherein step (g) comprises the step of (g1) rendering said video work, and (g2) viewing at least a portion of said rendered video work.

20. A method according to claim 14, wherein step (g) comprises the step of (g1) rendering said video work, thereby creating a rendered video work, (g2) storing said rendered video work in a computer readable medium, and, (g3) viewing at least a portion of said stored rendered video work.

21. A method according to claim 14, wherein step (f) comprises the step of:

(f1) performing steps (c) through (e) until substantially all of said video cells within said selected template are filled with video clips, thereby composing said video work.

* * * * *

UNITED STATES PATENT AND TRADEMARK OFFICE
CERTIFICATE OF CORRECTION

PATENT NO. : 7,352,952 B2 Page 1 of 1
APPLICATION NO. : 10/688002
DATED : April 1, 2008
INVENTOR(S) : Herberger et al.

It is certified that error appears in the above-identified patent and that said Letters Patent is hereby corrected as shown below:

Title page item 75
The first name of the second inventor should read --Titus--

Signed and Sealed this

Eighth Day of July, 2008

JON W. DUDAS
*Director of the United States Patent and Trademark Office*